(12) United States Patent
Singal et al.

(10) Patent No.: US 12,524,635 B2
(45) Date of Patent: *Jan. 13, 2026

(54) USER IDENTIFICATION DOCUMENT VERIFICATIONS

(71) Applicant: Mitek Systems, Inc., San Diego, CA (US)

(72) Inventors: Ashok Singal, San Diego, CA (US); Michael Ramsbacker, Cardiff, CA (US); James Treitler, San Diego, CA (US); Sanjay Gupta, Del Mar, CA (US); Michael Hagen, Los Altos, CA (US); Jason L. Gray, La Jolla, CA (US)

(73) Assignee: Mitek Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,131

(22) Filed: May 14, 2024

(65) Prior Publication Data

US 2024/0303451 A1 Sep. 12, 2024

Related U.S. Application Data

(63) Continuation of application No. 18/306,957, filed on Apr. 25, 2023, now Pat. No. 12,026,577, which is a
(Continued)

(51) Int. Cl.
*G06V 40/00* (2022.01)
*G06K 7/10* (2006.01)
(Continued)

(52) U.S. Cl.
CPC ..... *G06K 7/10386* (2013.01); *G06K 7/10009* (2013.01); *G06Q 10/10* (2013.01); *G06Q 50/00* (2013.01); *G06V 40/00* (2022.01)

(58) Field of Classification Search
CPC .......... G06K 7/10386; G06K 7/10009; G06Q 10/10; G06Q 50/00; G06V 10/24; G06V 30/40
See application file for complete search history.

(56) References Cited

U.S. PATENT DOCUMENTS

| | | |
|---|---|---|
| 6,269,169 B1 | 7/2001 | Funk et al. |
| 9,367,831 B1 | 6/2016 | Besehanic |

(Continued)

FOREIGN PATENT DOCUMENTS

| | | |
|---|---|---|
| EP | 1646966 A2 | 4/2006 |
| EP | 1677231 A1 | 7/2006 |

(Continued)

OTHER PUBLICATIONS

"Machine Readable Travel Documents Part 11, Security Mechanishs for MRTDS", Doc 9303, International Civil Aviation Organization, Seventh Edition, 2015, 112 pages.
(Continued)

*Primary Examiner* — Aaron W Carter
(74) *Attorney, Agent, or Firm* — Carr & Ferrell LLP

(57) ABSTRACT

Systems and methods for user identification (ID) document verification are provided. An exemplary method includes receiving an image of an ID document. A determination is made whether the ID document includes a near-field communications (NFC) chip that stores an ID photo associated with the ID document. Based on this determination, the ID document is verified by selectively using at least one of NFC chip authentication and optical authentication, to obtain a first verification result. Also, a photo of the user is captured by a camera associated with the client device. The method further includes receiving the photo of the user by a service provider; comparing the photo stored on the ID document with the photo of the user; based on the comparison, providing a second verification result for the ID document;
(Continued)

and transmitting both the first and second verification results to the client device.

30 Claims, 9 Drawing Sheets

Related U.S. Application Data continuation of application No. 17/954,251, filed on Sep. 27, 2022, now Pat. No. 11,681,883, which is a continuation of application No. 16/917,832, filed on Jun. 30, 2020, now Pat. No. 11,461,567, which is a continuation-in-part of application No. 16/529,293, filed on Aug. 1, 2019, now Pat. No. 10,747,971, which is a continuation of application No. 15/604,372, filed on May 24, 2017, now Pat. No. 10,372,950, which is a continuation of application No. 14/722,058, filed on May 26, 2015, now Pat. No. 9,665,754.

(60) Provisional application No. 62/004,101, filed on May 28, 2014.

(51) Int. Cl.
    *G06Q 10/10*       (2023.01)
    *G06Q 50/00*       (2012.01)

(56) References Cited

U.S. PATENT DOCUMENTS

| | | |
|---|---|---|
| 9,369,287 B1 | 6/2016 | Sarvestani |
| 9,665,754 B2 | 5/2017 | Hagen |
| 10,372,950 B2 | 8/2019 | Hagen |
| 10,402,944 B1 | 9/2019 | Pribble et al. |
| 10,498,401 B1 | 12/2019 | Rule et al. |
| 10,747,971 B2 | 8/2020 | Hagen |
| 10,885,514 B1 | 1/2021 | Hart et al. |
| 11,080,985 B2 | 8/2021 | Paisson |
| 11,461,567 B2 | 10/2022 | Singal et al. |
| 11,640,582 B2 | 5/2023 | Singal et al. |
| 11,681,883 B2 | 6/2023 | Singal et al. |
| 12,026,577 B2 | 7/2024 | Singal et al. |
| 12,026,670 B2 | 7/2024 | Singal et al. |
| 12,198,215 B2 | 1/2025 | Gupta et al. |
| 12,475,435 B2 | 11/2025 | Singal et al. |
| 2002/0169721 A1 | 11/2002 | Cooley et al. |
| 2005/0007236 A1 | 1/2005 | Lane et al. |
| 2005/0067487 A1 | 3/2005 | Brundage et al. |
| 2006/0267737 A1 | 11/2006 | Colby |
| 2006/0274945 A1 | 12/2006 | Chu et al. |
| 2007/0109101 A1 | 5/2007 | Colby |
| 2007/0122004 A1 | 5/2007 | Brown et al. |
| 2007/0200679 A1 | 8/2007 | Colby |
| 2007/0200680 A1 | 8/2007 | Colby |
| 2007/0200681 A1 | 8/2007 | Colby |
| 2007/0200684 A1 | 8/2007 | Colby |
| 2007/0260886 A1 | 11/2007 | Dufour |
| 2008/0024271 A1 | 1/2008 | Oberman et al. |
| 2008/0093447 A1 | 4/2008 | Johnson et al. |
| 2008/0144947 A1 | 6/2008 | Alasia et al. |
| 2008/0195858 A1 | 8/2008 | Nguyen |
| 2008/0211622 A1 | 9/2008 | Rindtorff et al. |
| 2008/0238681 A1 | 10/2008 | Rodgers |
| 2008/0279959 A1 | 11/2008 | Holmes |
| 2009/0154778 A1 | 6/2009 | Lei et al. |
| 2009/0309704 A1 | 12/2009 | Chang et al. |
| 2010/0015585 A1 | 1/2010 | Baker |
| 2010/0052852 A1 | 3/2010 | Mohanty |
| 2010/0066072 A1 | 3/2010 | Paeschke et al. |
| 2010/0085257 A1 | 4/2010 | Kalliola et al. |
| 2010/0150348 A1 | 6/2010 | Fairbanks et al. |
| 2010/0245034 A1 | 9/2010 | D'Oliveiro et al. |
| 2010/0263034 A1 | 10/2010 | Banchelin |
| 2010/0332838 A1 | 12/2010 | Zhu et al. |
| 2011/0068173 A1 | 3/2011 | Powers et al. |
| 2011/0156864 A1 | 6/2011 | Green |
| 2011/0248851 A1 | 10/2011 | Pham |
| 2011/0309146 A1 | 12/2011 | Zazzu et al. |
| 2012/0011010 A1 | 1/2012 | Boulanouar |
| 2012/0139703 A1 | 6/2012 | Szoke et al. |
| 2012/0154246 A1 | 6/2012 | Tietke et al. |
| 2012/0155700 A1 | 6/2012 | Huang |
| 2012/0229872 A1 | 9/2012 | Dolev |
| 2012/0299709 A1 | 11/2012 | Nishimura |
| 2013/0012124 A1 | 1/2013 | Hymel et al. |
| 2013/0084801 A1 | 4/2013 | Royston et al. |
| 2013/0214898 A1 | 8/2013 | Pineau et al. |
| 2013/0214902 A1 | 8/2013 | Pineau et al. |
| 2013/0222119 A1 | 8/2013 | Tietke et al. |
| 2013/0243266 A1 | 9/2013 | Lazzouni |
| 2013/0281014 A1 | 10/2013 | Frankland et al. |
| 2013/0305059 A1 | 11/2013 | Gormley et al. |
| 2013/0311788 A1 | 11/2013 | Faher et al. |
| 2014/0002336 A1 | 1/2014 | Kaine |
| 2014/0009348 A1 | 1/2014 | Behin |
| 2014/0019768 A1 | 1/2014 | Pineau et al. |
| 2014/0046954 A1 | 2/2014 | MacLean et al. |
| 2014/0058951 A1 | 2/2014 | Kuppuswamy |
| 2014/0065959 A1 | 3/2014 | Tanaka et al. |
| 2014/0168012 A1 | 6/2014 | Mankowski et al. |
| 2014/0230039 A1 | 8/2014 | Prakash et al. |
| 2014/0253297 A1 | 9/2014 | Kawaguchi et al. |
| 2014/0270400 A1 | 9/2014 | Natale et al. |
| 2014/0340701 A1 | 11/2014 | Okamura et al. |
| 2014/0369570 A1 | 12/2014 | Cheikh et al. |
| 2014/0376050 A1 | 12/2014 | Baba |
| 2015/0004934 A1 | 1/2015 | Qian et al. |
| 2015/0088776 A1 | 3/2015 | Parrish et al. |
| 2015/0170085 A1 | 6/2015 | Amtrup et al. |
| 2015/0199568 A1 | 7/2015 | van Deventer et al. |
| 2015/0312879 A1 | 10/2015 | Lagnado |
| 2015/0347839 A1 | 12/2015 | Hagen |
| 2016/0104041 A1 | 4/2016 | Bowers et al. |
| 2016/0119548 A1 | 4/2016 | Geurts et al. |
| 2016/0162729 A1 | 6/2016 | Hagen et al. |
| 2016/0210621 A1 | 7/2016 | Khan |
| 2016/0239657 A1 | 8/2016 | Loughlin-McHugh et al. |
| 2016/0360348 A1 | 12/2016 | Ueda |
| 2016/0366294 A1 | 12/2016 | Uroskin et al. |
| 2017/0156024 A1 | 6/2017 | Shigaki et al. |
| 2017/0168759 A1 | 6/2017 | Hirotani et al. |
| 2017/0255800 A1 | 9/2017 | Hagen |
| 2017/0303262 A1 | 10/2017 | Yuan et al. |
| 2017/0324750 A1 | 11/2017 | Khan |
| 2017/0328805 A1 | 11/2017 | Bermudez et al. |
| 2017/0337403 A1 | 11/2017 | Ohno |
| 2018/0088186 A1 | 3/2018 | Bhattacharyya |
| 2018/0092136 A1 | 3/2018 | Shiobara et al. |
| 2018/0175676 A1 | 6/2018 | Ikefuji et al. |
| 2018/0189583 A1 | 7/2018 | Wohlken et al. |
| 2018/0260617 A1 | 9/2018 | Jones et al. |
| 2018/0278739 A1 | 9/2018 | Mei |
| 2019/0043038 A1 | 2/2019 | Jang et al. |
| 2019/0139641 A1* | 5/2019 | Itu .................... G06N 3/045 |
| 2019/0347888 A1 | 11/2019 | Agbeyo |
| 2019/0354735 A1 | 11/2019 | Madhusudhana et al. |
| 2019/0354736 A1 | 11/2019 | Hagen |
| 2020/0195636 A1 | 6/2020 | Landrock et al. |
| 2020/0249835 A1 | 8/2020 | Ueno et al. |
| 2020/0334429 A1 | 10/2020 | Singal et al. |
| 2020/0334430 A1 | 10/2020 | Gupta et al. |
| 2020/0334431 A1 | 10/2020 | Singal et al. |
| 2021/0156691 A1 | 5/2021 | Kozhaya et al. |
| 2021/0240773 A1 | 8/2021 | Chen et al. |
| 2021/0374387 A1 | 12/2021 | Whitelaw et al. |
| 2023/0018280 A1 | 1/2023 | Singal et al. |
| 2023/0139948 A1 | 5/2023 | Akashika |
| 2023/0222444 A1 | 7/2023 | Singal et al. |
| 2023/0259726 A1 | 8/2023 | Singal et al. |

(56) References Cited

U.S. PATENT DOCUMENTS

2024/0296418 A1 9/2024 Singal et al.
2025/0104174 A1* 3/2025 Gupta ............... G06K 7/10009

FOREIGN PATENT DOCUMENTS

| | | | |
|---|---|---|---|
| EP | 1724707 | A2 | 11/2006 |
| EP | 1755065 | A2 | 2/2007 |
| EP | 1851668 | A2 | 11/2007 |
| EP | 1891607 | B1 | 10/2008 |
| EP | 2073153 | A1 | 6/2009 |
| EP | 2100403 | A2 | 9/2009 |
| EP | 2075726 | B1 | 7/2010 |
| EP | 2240878 | A2 | 10/2010 |
| EP | 2274702 | A1 | 1/2011 |
| EP | 1938118 | B1 | 5/2012 |
| EP | 2465075 | A1 | 6/2012 |
| EP | 2474931 | A1 | 7/2012 |
| EP | 2085913 | B1 | 8/2012 |
| EP | 2508999 | A1 | 10/2012 |
| EP | 2038811 | B1 | 1/2013 |
| EP | 2603019 | A1 | 6/2013 |
| EP | 2591463 | B1 | 10/2014 |
| EP | 2803016 | A1 | 11/2014 |
| EP | 2219878 | B1 | 3/2015 |
| EP | 2973378 | A1 | 1/2016 |
| EP | 2976706 | A2 | 1/2016 |
| EP | 3079103 | A1 | 10/2016 |
| EP | 3093797 | A1 | 11/2016 |
| EP | 3385895 | A1 | 10/2018 |
| EP | 3570215 | A1 | 11/2019 |
| EP | 2798571 | B1 | 4/2020 |
| EP | 2313872 | B1 | 4/2021 |
| JP | 2010109594 | A | 5/2010 |
| WO | WO2006014481 | A2 | 2/2006 |
| WO | WO2007105720 | A1 | 9/2007 |
| WO | WO2013000614 | A1 | 1/2013 |
| WO | WO2014025540 | A2 | 2/2014 |
| WO | WO2016128568 | A1 | 8/2016 |
| WO | WO2016193765 | A1 | 12/2016 |
| WO | WO2017207064 | A1 | 7/2017 |
| WO | WO2018018175 | A1 | 2/2018 |
| WO | WO2018152597 | A1 | 8/2018 |
| WO | WO2019002832 | A1 | 1/2019 |
| WO | WO2019009685 | A1 | 1/2019 |
| WO | WO2019048574 | A1 | 3/2019 |
| WO | WO2019089164 | A1 | 5/2019 |

OTHER PUBLICATIONS

"Machine Readable Travel Documents (MRTDs): History, Interoperability, and Implementation", Version: Release 1, Draft 1.4, International Civil Aviation Organization, Mar. 23, 2007, pp. 1-60.
Pooters, Ivo, "Keep Out of My Passport: Access Control Mechanisms in E-Passports" in: Technical Report, Jun. 15, 2008, pp. 1-13.
Kinneging, Tom A.F., "PKI for Machine Readable Travel Documents offering ICC Read-Only Access", Version 1.1, International Civil Aviation Organization, Oct. 1, 2004, pp. 1-57.
Wikipedia, "Euclidean Vector", [online], [retrieved on Sep. 30, 2022], Retrieved from the Internet: <URL:https://en.wikipedia.org/wiki/Euclidean_vector>, Revision dated Jun. 12, 2020, 18 pages.
Opposition against European Patent 4008059, filed Aug. 5, 2025 in European Patent No. EP4008059, 27 pages.
EP 4008059 B1 Feature Table filed in Opposition against European Patent 4008059, filed Aug. 5, 2025, 1 page.
Opposition against European Patent 4007968, filed Oct. 22, 2025 in European Patent No. EP4007968, 64 pages (with English Translation).
EP 4007968 B1 Feature Table filed in Opposition against European Patent 4007968, filed Oct. 22, 2025, 1 page.
Mutabazi, Patrick, "Biometric Passports / ePassports and their Benefits," Mar. 27, 2017, 17 pages.
"Best Practice Tehnical Guidelines for Automated Border Control (ABC) Systems", FRONTEX, Sep. 2015, 62 pages.

* cited by examiner

USER IDENTIFICATION DOCUMENT VERIFICATIONS

CROSS-REFERENCE TO RELATED APPLICATIONS

The present utility patent application is a continuation application of U.S. patent application Ser. No. 18/306,957 filed Apr. 25, 2023, now U.S. Pat. No. 12,026,577 issued on Jul. 2, 2024, which is a continuation application of U.S. patent application Ser. No. 17/954,251 filed Sep. 27, 2022, now U.S. Pat. No. 11,681,883 issued on Jun. 20, 2023, which is a continuation application of U.S. patent application Ser. No. 16/917,832 filed Jun. 30, 2020, now U.S. Pat. No. 11,461,567 issued on Oct. 4, 2022, which is a continuation-in-part application of and claims priority benefit of U.S. patent application Ser. No. 16/529,293 filed Aug. 1, 2019, now U.S. Pat. No. 10,747,971 issued on Aug. 18, 2020, which is a continuation of and claims priority benefit of U.S. patent application Ser. No. 15/604,372, filed May 24, 2017, now U.S. Pat. No. 10,372,950 issued on Aug. 6, 2019, which is a continuation of U.S. patent application Ser. No. 14/722,058, filed May 26, 2015, now U.S. Pat. No. 9,665,754 issued on May 30, 2017, which is related to and claims priority benefit of U.S. provisional application No. 62/004,101, filed May 28, 2014 under 35 U.S.C. 119(e). The present utility patent application is also related to U.S. patent application Ser. No. 16/917,776 filed Jun. 30, 2020 entitled "Self-Sovereign Identity Systems and Methods for Identification Documents" and U.S. patent application Ser. No. 16/917,746 filed Jun. 30, 2020, entitled "Alignment of Antennas on Near Field Communication Devices for Communication". The contents of all of these applications are incorporated herein by reference for all purposes to the extent that such subject matter is not inconsistent herewith or limiting hereof.

TECHNICAL FIELD

The present disclosure relates generally to data processing and, more specifically, to identification (ID) verification using systems and methods of hybrid near-field communication (NFC) and optical authentication.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Provided are methods and systems for ID document verification. In general, the disclosed methods and systems are directed to near-field communication authentication and optical authentication, as well as hybrid methods of both near field communication authentication and optical authentication.

According to one example embodiment of the disclosure, systems and methods for identification (ID) document verification are provided. An exemplary method includes receiving, by a client device, an image of an ID document. Based on the image of the ID document received, a determination is made whether the ID document includes a near-field communications (NFC) chip that stores data comprising identifying information for an owner of the identification. Based on this determination of whether the ID document includes an NFC chip, the ID document is verified by selectively using at least one of NFC chip authentication and optical authentication, to obtain a first verification result.

The method can further include capturing a photo of the user by a camera associated with the client device. The method further includes receiving the photo of the user by a service provider; comparing the photo stored on the ID document with the photo of the user; based on the comparison, providing a second verification result for the ID document; and transmitting both the first and second verification results to the client device.

Other example embodiments of the disclosure and aspects will become apparent from the following description taken in conjunction with the following drawings.

BRIEF DESCRIPTION OF THE DRAWINGS

Embodiments are illustrated by way of example and not limitation in the figures of the accompanying drawings.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

Identity verification is important in enabling and securing financial operations, hiring processes, health care, professional services, and so forth. However, ID documents can be tampered with and falsified for fraudulent purposes. To provide an additional protective measure, an RFID chip can be embedded in the ID document. Digital data stored on the RFID chip can duplicate data printed on the ID document. The digital data can be authenticated via Public Key Infrastructure, which makes forgery difficult and expensive. However, conventional digital verification using RFID chip requires special purpose readers.

A system for ID document verification is provided. The system for ID document verification can allow verification of ID documentation having an embedded RFID chip. An image of the ID document can be captured using a camera associated with a client device. The client device can transmit the ID document image to a server for processing for retrieval of printed data represented by the ID document (e.g., holder's name, age, fingerprints, document number, and expiration date). The retrieved data may be sent back to the client device and further to a server. The system for ID document verification residing on the client device may use the retrieved data as a key to unlock the RFID chip and access digital data stored in the RFID chip. The digital data may be transmitted to the server, where the system for ID document verification compares the printed and digital data to determine whether the printed and digital data are identical. Additionally, the system for ID document verification may perform a facial recognition using the printed and digital data. Based on the comparison and/or recognition, similarities between the printed and digital data may be ascertained. Such verification can establish whether printed data in the ID document was altered and whether the ID document is authentic.

In some embodiments, the system for ID document verification can also allow for personal information extraction from a physical ID document.

Figure 1:
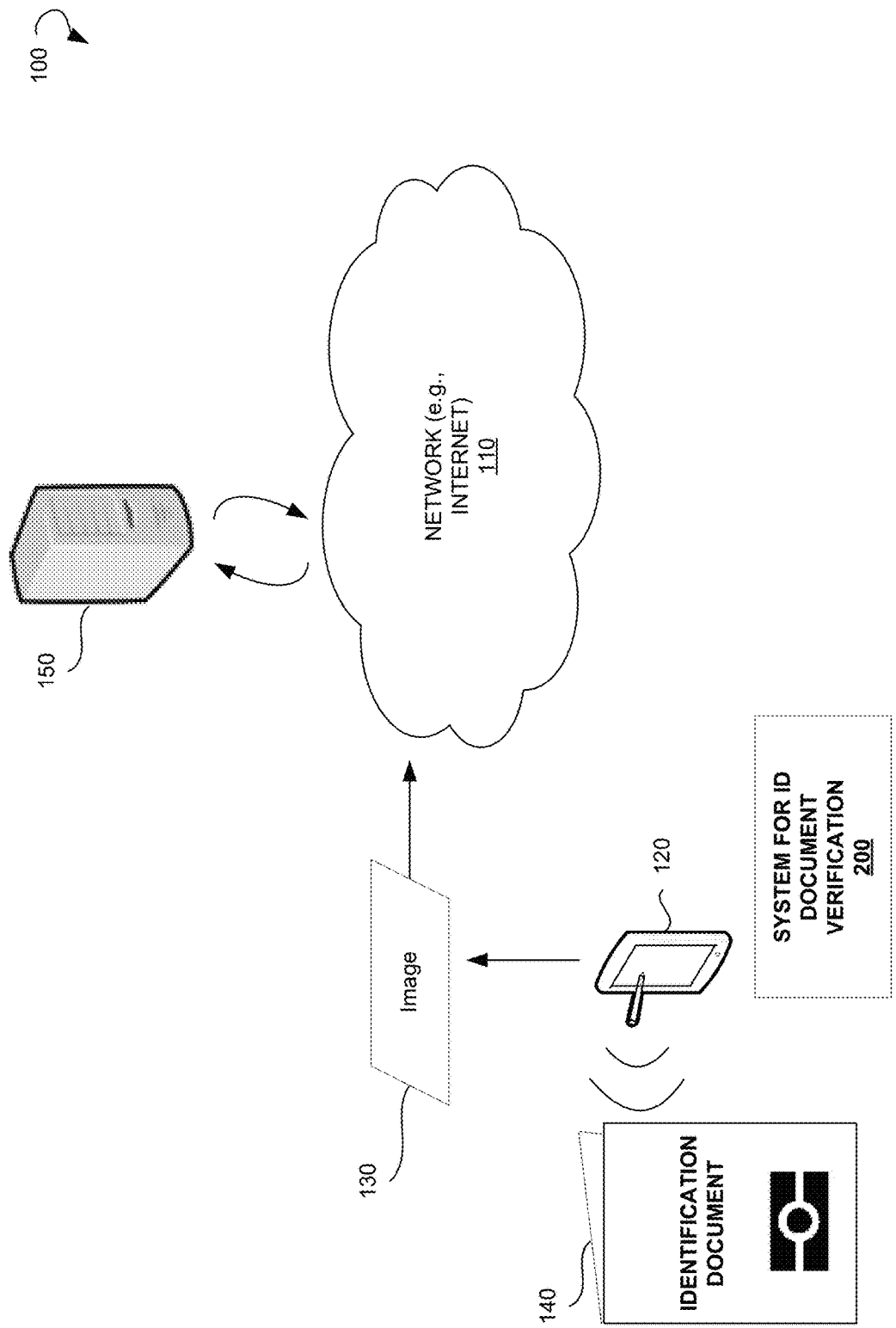
FIG. 1 illustrates an environment within which systems and methods for ID document verification are implemented.

FIG. 1 illustrates an environment 100 within which the systems and methods for ID document verification can be implemented, in accordance with some embodiments. A system 200 for ID document verification may include a server-based distributed application, which may include a central component residing on a server 150 and one or more client applications residing on a client device 120 and communicating with the central component via a network 110. A user may communicate with the system 200 via a client application available through the client device 120. In other embodiments, the system 200 may be a cloud-based application with the central component residing on the server 150 and accessible via a web browser on the client device 120.

The network 110 may include the Internet or any other network capable of communicating data between devices. Suitable networks may include or interface with any one or more of, for instance, a local intranet, a Personal Area Network, a Local Area Network (LAN), a Wide Area Network (WAN), a Metropolitan Area Network (MAN), a Virtual Private Network (VPN), a storage area network, a frame relay connection, an Advanced Intelligent Network connection, a synchronous optical network connection, a digital T1, T3, E1 or E3 line, Digital Data Service connection, Digital Subscriber Line connection, an Ethernet connection, an Integrated Services Digital Network (ISDN) line, a dial-up port such as a V.90, V.34 or V.34bis analog modem connection, a cable modem, an Asynchronous Transfer Mode connection, or an Fiber Distributed Data Interface or Copper Distributed Data Interface connection. Furthermore, communications may also include links to any of a variety of wireless networks, including Wireless Application Protocol, General Packet Radio Service, Global System for Mobile Communication, Code Division Multiple Access or Time Division Multiple Access, cellular phone networks, Global Positioning System (GPS), cellular digital packet data, Research in Motion, Limited duplex paging network, Bluetooth radio, or an IEEE 802.11-based radio frequency network. The network 110 can further include or interface with any one or more of an RS-232 serial connection, an IEEE-1394 (Firewire) connection, a Fiber Channel connection, an infrared port, a Small Computer Systems Interface connection, a Universal Serial Bus (USB) connection or other wired or wireless, digital or analog interface or connection, mesh, or Digi® networking. The network 110 may include a network of data processing nodes that are interconnected for the purpose of data communication. The network may include a Software-defined Networking (SDN). The SDN may include one or more of the above network types. Generally, the network 110 may include a number of similar or dissimilar devices connected together by a transport medium enabling communication between the devices by using a predefined protocol. Those skilled in the art will recognize that the present disclosure may be practiced within a variety of network configuration environments and on a variety of computing devices.

An ID document 140 can include a document having an embedded RFID chip (for example, a biometric passport, digital passport, government issued ID, drivers' license, and so forth).

To verify the ID document 140, a user can cause the system 200 capture an image 130 of the ID document 140 by using a camera associated with the client device 120 (smart phone, a notebook, a personal computer (PC), a tablet PC, or the like). An image 130 associated with the ID document 140 may be transmitted to the server 150 either via a mobile application, a stand-alone web application, or via a fully integrated service (XML, i-frame). The image 130 may be captured by a camera associated with the client device 120, e.g. a phone camera, a tablet PC camera, and so forth. The server 150 may receive and analyze the image 130 to recognize printed data associated with the ID document 140 (for example, issue date, holder's name, age, gender, holder's fingerprint, and so forth). Printed data can be recognized by optical character recognition (OCR).

The results of the printed data analysis can be transmitted back to the client device 120. The client device 120 may scan the RFID chip embedded in the ID document 140 using an RFID reader (or an NFC reader). The RFID reader can be a part of the client device 120 or it can be detachably attached to the client device 120 via one of the ports. Alternatively, the RFID reader can be a stand-alone device and the client device 120 can communicate with it wirelessly (for example, via Bluetooth).

The retrieved printed data can be used as a key to access the digital data on the RFID chip of the ID document 140. By matching the digital and printed data, the system 200 for ID document verification may confirm authenticity of the ID document 140.

Figure 2:
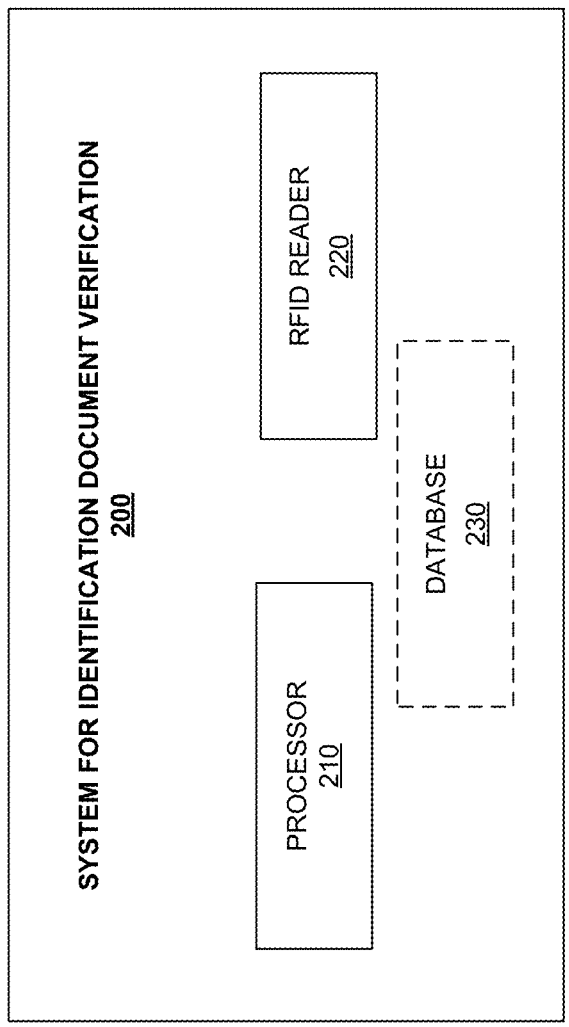
FIG. 2 is a block diagram showing a system for ID document verification.

FIG. 2 shows a detailed block diagram of the system 200 for ID document verification, in accordance with an example embodiment. The system 200 may include a processor 210, an RFID reader 220, and an optional database 230. The processor 210 may be configured to receive an image associated with an ID document. The image may be captured by the camera associated with the client device. The processor 210 may transmit the image to a remote server. The server processes the image using OCR to detect various zones on the image containing data associated with the ID document and a holder of the ID document and extract printed data from the image. The processor 210 may be further configured to receive the extracted printed data from the server. The RFID reader 220 may use the printed data as a key to access the RFID chip of the ID document. In such a way, the RFID reader 220 may retrieve digital data from the RFID chip. The processor 210 may analyze the digital data and match the digital and printed data to check if they are identical. Alternatively, a server may perform the analysis. The server may further perform facial recognition based on photos from the digital data (e.g., RFID passphoto), from the printed data (e.g., passphoto ID), and/or a photo of the user captured by the client device. If the digital and printed data proves identical, the ID document may be verified. If the digital and printed data differ or are absent or nonstandard, the ID document may be refused.

An optional database 230 may be configured to store printed data and digital data as well as verification results.

The processor 210 may comprise, or may be in communication with, media (for example, computer-readable media) that stores instructions that, when executed by the processor 210, cause the processor 210 to perform the elements described herein. Furthermore, the processor 210 may operate any operating system capable of supporting locally executed applications, client-server based applications, and/or browser or browser-enabled applications.

Figure 3:
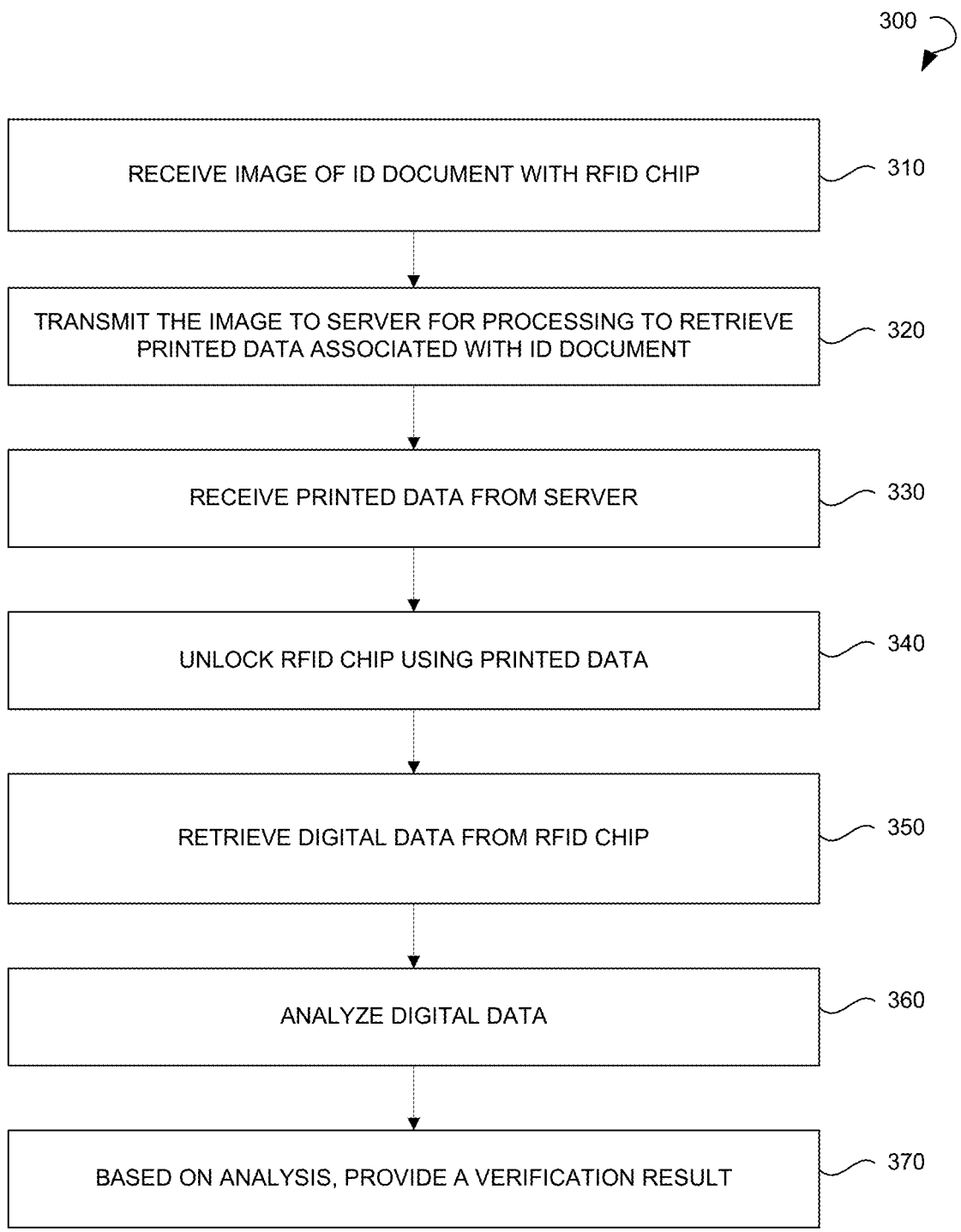
FIG. 3 is a process flow diagram showing a method for ID document verification.

FIG. 3 is a process flow diagram showing a method 300 for ID document verification within the environment described with reference to FIG. 1. The method 300 may commence with receiving an image of an ID document that has an embedded RFID chip at operation 310. The ID document may include a government issued ID, a student ID, an employment ID, a driver's license, a passport, a travel document, and so forth. The received image may include a picture, a scan, and so forth. The image may be captured by a camera associated with the user (for example, a standalone camera; a camera of a user device, such as a smart phone, a PC, a tablet PC; and so forth).

The method 300 may proceed with transmitting the image to a server for processing at operation 320. The processing can include optical character recognition to obtain printed data. The printed data may include holder's name, date of birth, gender, fingerprint, document number, and so forth. The printed data obtained as a result of processing may be received from the server at operation 330 and used to unlock the RFID chip at operation 340. After unlocking the RFID chip (for example, using any recognized text as a key to access the RFID chip), digital data (or biometric data) stored in the RFID chip may be retrieved at operation 350.

At operation 360, the digital data may be analyzed to check the authenticity of the ID document. The digital data in general duplicates the printed data. By comparing the digital data from the RFID chip and the recognized printed data, the system for ID document verification can ensure that printed data was not altered and the ID document is not forged. Based on the analysis, the system may determine that the digital data and printed data are identical and verify the ID document. Alternatively, according to the analysis, the system may determine one or more evidences of forgery (for example, a difference of the printed data and the digital data, an absence of the digital data, nonstandard digital data, and so forth). On the determining the one or more evidences of forgery, the system may reject the ID document. A verification result may be provided at operation 370.

In some embodiments, data of the verified ID document may be used to automatically populate an electronic form, fields associated with a web resource, and so forth. Thus, filling in forms, may be facilitated and accelerated. Moreover, automatic filling in of electronic forms or blanks allows avoiding mistakes and misprints pertaining to manual entry.

Figure 4:
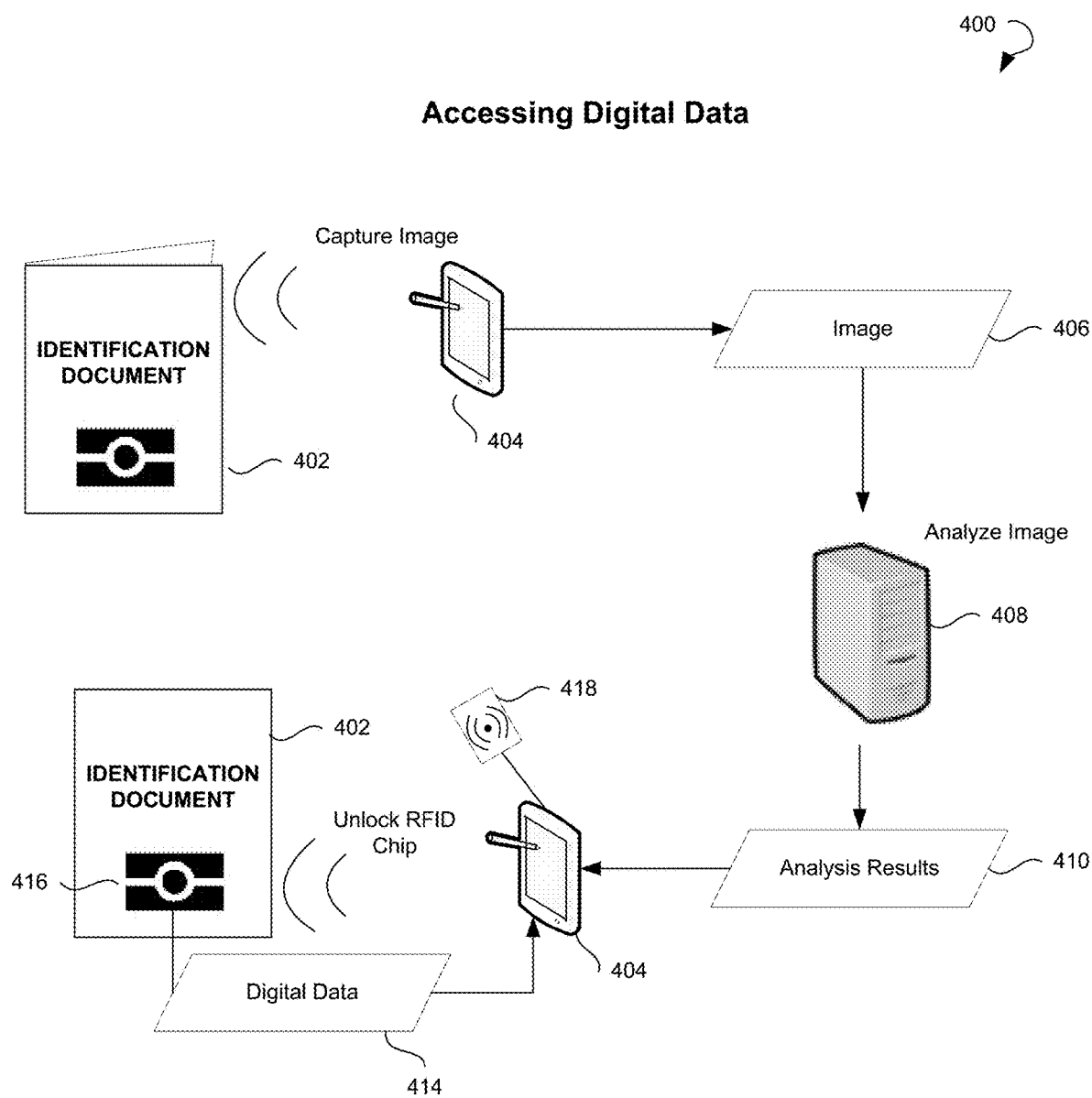
FIG. 4 illustrates accessing digital data related to an ID document.

FIG. 4 illustrates accessing digital data 400 in a RFID chip associated with the ID document, in accordance with some embodiments. A user may capture an image 406 of an ID document 402 using a camera embedded in or connected to a client device 404. The image 406 may be automatically transmitted to a server 408. The image 406 received by the server 408 may be subjected to OCR. Printed information in the image 406 may be analyzed to extract textual and/or other relevant data associated with the ID document 402 and the holder of the ID document 402 (e.g., holder's date of birth, first name, last name, and the like). The results of the analysis 410 can be transmitted back to the client device 404.

The client device 404 can scan an RFID chip 416 in the ID document 402 using an RFID reader 418 (or an NFC reader). The RFID reader 418 can be either embedded in the client device 404 or detachably attached to the client device 404 via a port of the client device 404. The digital data 414 in the RFID chip 416 may be encrypted, so the retrieved printed data can be used as a key to access the digital data 414.

The digital data 414 and printed data can be compared on the client device 404 to verify ID document identity. Additionally, the digital data 414 can be used to fill-in forms, employment forms, medical records, and so forth.

Figure 5:
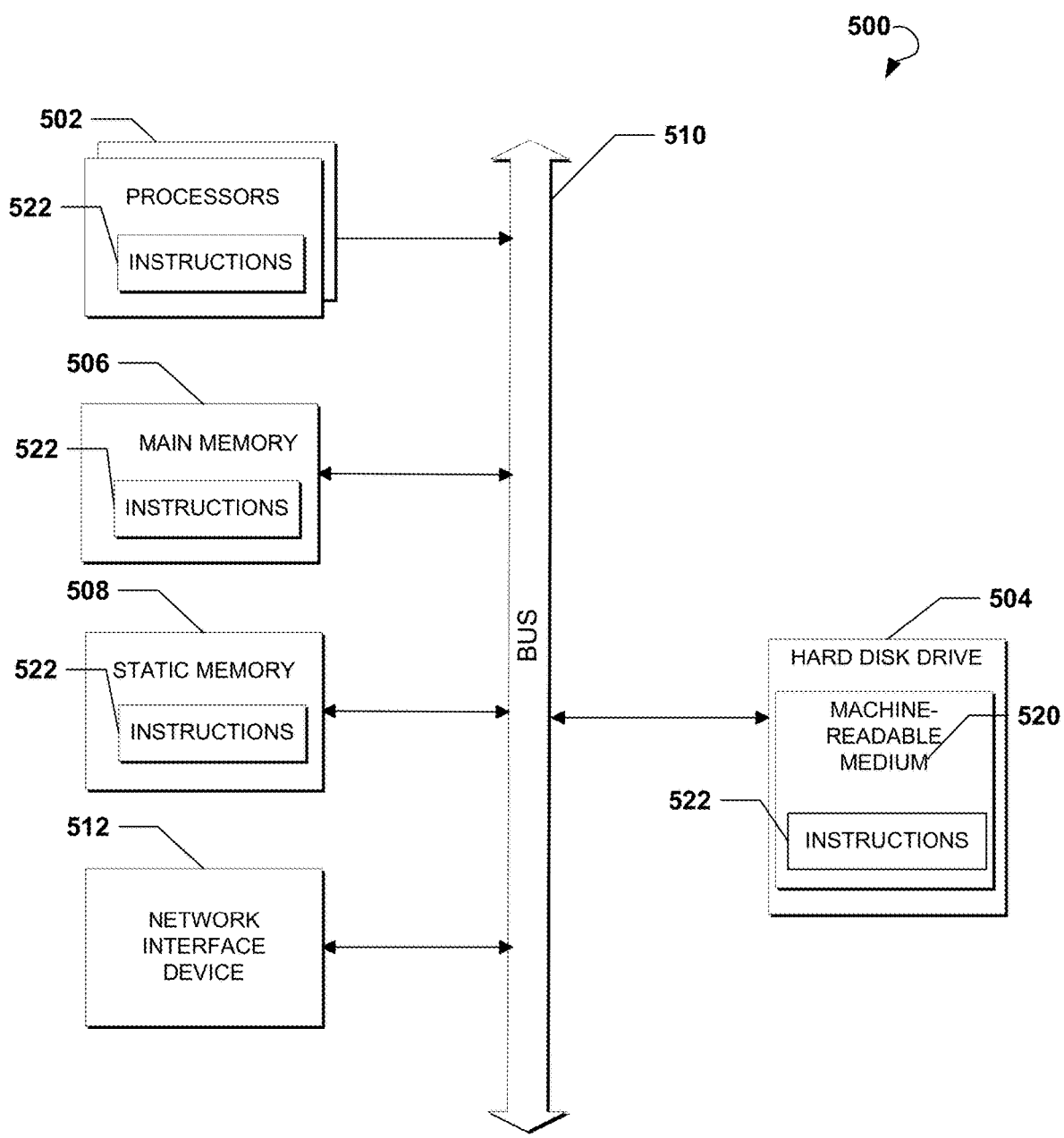
FIG. 5 illustrates a diagrammatic representation of a computing device for a machine in the exemplary electronic form of a computer system, within which a set of instructions for causing the machine to perform any one or more of the methodologies discussed herein can be executed.

FIG. 5 shows a diagrammatic representation of a computing device for a machine in the exemplary electronic form of a computer system 500, within which a set of instructions for causing the machine to perform any one or more of the methodologies discussed herein can be executed. In various exemplary embodiments, the machine operates as a standalone device or can be connected (e.g., networked) to other machines. In a networked deployment, the machine can operate in the capacity of a server or a client machine in a server-client network environment, or as a peer machine in a peer-to-peer (or distributed) network environment. The machine can be a PC, a tablet PC, a set-top box, a cellular telephone, a digital camera, a portable music player (e.g., a portable hard drive audio device, such as an Moving Picture Experts Group Audio Layer 3 player), a web appliance, a network router, a switch, a bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 500 includes a processor or multiple processors 502, a hard disk drive 504, a main memory 506, and a static memory 508, which communicate with each other via a bus 510. The computer system 500 may also include a network interface device 512. The hard disk drive 504 may include a computer-readable medium 520, which stores one or more sets of instructions 522 embodying or utilized by any one or more of the methodologies or functions described herein. The instructions 522 can also reside, completely or at least partially, within the main memory 506, the static memory 508, and/or within the processors 502 during execution thereof by the computer system 500. The main memory 506 and the processors 502 also constitute machine-readable media.

While the computer-readable medium 520 is shown in an exemplary embodiment to be a single medium, the term "computer-readable medium" should be taken to include a single medium or multiple media (e.g., a centralized or distributed database, and/or associated caches and servers) that store the one or more sets of instructions. The term "computer-readable medium" shall also be taken to include any medium that is capable of storing, encoding, or carrying a set of instructions for execution by the machine and that causes the machine to perform any one or more of the methodologies of the present application, or that is capable of storing, encoding, or carrying data structures utilized by or associated with such a set of instructions. The term "computer-readable medium" shall accordingly be taken to include, but not be limited to, solid-state memories, optical and magnetic media. Such media can also include, without limitation, hard disks, floppy disks, NAND or NOR flash memory, digital video disks (DVDs), Random Access Memory (RAM), Read-Only Memory (ROM), and the like.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for identification document verification are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

As previously described, ID documents can be tampered with, misused, and falsified for fraudulent purposes. To provide an additional security layer or additional protective measures, identification verification utilizing near-field communications (NFC) authentication can be used. According to the present disclosure, the NFC chip is included or can be embedded in an ID document. Data stored on the NFC chip can include identification information for the owner of the ID document.

A system for ID document verification is provided. The system for ID document verification can allow verification of ID documentation having an embedded NFC chip. An image of the ID document can be captured using a camera associated with a client device. The client device can transmit the ID document image to a server for processing for retrieval of data including the ID photo associated with the ID document. The ID photo is stored on the NFC chip of the ID document and is typically a high-resolution photo of the ID document which can be used to verify the identity of the owner of the ID document. In some embodiments, the ID photo that is stored on the ID document may be a digital passphoto that can be downloaded from the NFC chip. Further data that is represented by the ID document includes printed data (e.g., holder's name, age, fingerprints, document number, and expiration date). The retrieved data may be sent back to the client device and further to a server. The system for ID document verification residing on the client device may use the retrieved data as a key to unlock the NFC chip and access the data stored in the NFC chip. The data from the NFC chip may be transmitted to the server, where the system for ID document verification may use various verification methods to determine whether the ID document is authentic. Additionally, the system for ID document verification may perform a facial recognition. Such verification methods described herein can establish whether the ID document was altered, whether the ID document is authentic and/or whether the NFC chip was tampered with. In some embodiments, the system for ID document verification can also allow for personal information extraction from a physical ID document. Once the system verifies that the ID document is valid and verifies the user's identity, this verification of a user's identity can be stored, attached, linked, coupled or otherwise associated to the user's client device.

Furthermore, in some embodiments, the systems described herein can follow one or both of two distinct paths in a seamless manner, in terms of user experience. In one embodiment, the system obtains a photo of the ID document being used, transmits the photo to the service provider of the system, and determines based on the photo if the ID document has an NFC chip. If the system determines from inspection of the photo taken that the ID document includes an NFC chip, then the NFC authentication path is taken. On the other hand, if the system determines from inspection of the photo taken that the ID document does not includes an NFC chip, then the system will proceed with a method of optical authentication without having to retrace steps. More detailed descriptions of both the NFC authentication and the optical authentication are provided later herein.

The ability to utilize the paths of one or both NFC authentication and optical authentication are helpful to provide coverage in a number of possible scenarios. For instance, if the user is a Dutch citizen who wishes to open a bank account, and they have a Dutch passport or identification card that has an NFC chip as their ID document, then they can use that ID document to verify their identity with the bank, by utilizing the NFC authentication path.

However, if the user does not have a passport, but rather has a driver's license that does not have an NFC chip, or if the user is having difficulty in having their NFC chip of their ID document read by the NFC reader, the NFC authentication path can be skipped altogether by the system, and the optical authentication path can be utilized instead by the system to verify identification automatically and in a seamless manner.

In further embodiments, the system can authenticate a document in a hybrid fashion performing the steps of both paths (namely, NFC chip authentication and optical authentication). In other words, the system can transmit the NFC data to the server and it can also perform optical authentication using images that the system already has stored on the server or perform optical authentication based on a comparison of a selfie photo of the user of the mobile device and the photo stored on the ID document. These hybrid methods help to incorporate a standard NFC authentication step into the workflow for users who are unable to have their NFC chip successfully read by the NFC reader using their mobile device.

The user may request a two-way face comparison or a three-way face comparison for optical authentication. For a two-way face comparison, the face comparison is made between the digital passphoto downloaded from the NFC chip of the ID document and a selfie of the user has taken using the client device. In other words, a photo stored on the NFC chip of an ID document can be compared against a user's selfie.

If the user requests for a three-way face comparison for optical authentication, then the face comparison is between the digital passphoto downloaded from the NFC chip of the ID document, the selfie of the user that the user has taken using the client device, and a portrait on the ID document (which is a photo that is visible on the ID document). It should be noted that the photo stored on the NFC chip of an ID document is harder (if not impossible) to tamper with, whereas the portrait on the ID document could be physically replaced.

The hybrid NFC chip authentication and optical authentication methods provides benefits to both identification verification and user verification. As used throughout this application, identification verification refers to the verification of whether an object (such as an ID document) provided by the user is authentic and original. In contrast, user verification refers to a verification of whether the user is who they claim to be.

NFC, when available, provides a highly reliable means of authenticating the validity of an object or an ID document. However, unless the NFC chip supports clone detection measures (which many do not), NFC authentication alone is not sufficient to prove that the user currently has physical control of the document, which an image of the document does do. Thus, the hybrid NFC chip authentication and optical authentication approach is more reliable than either method separately. Also, regarding user verification, a digital passphoto provides a third data point (besides the two data points of a physical object or ID document image and a user selfie), which serves to improve the confidence of the comparison/assessment. In other words, a comparison can be made of a photo of a physical object or an ID document, a photo of a user's selfie, and a digital passphoto, in order to determine whether the user is who they claim to be. If the three data points match or are substantially similar, then the system will provide a verification result indicating the user is indeed who they claim to be.

In some embodiments, these systems and methods can be used in conjunction with a self-sovereign identity (SSI) that is backed by verification of near-field communication (NFC) information stored on an object, such as an identification document. It will be understood that while some embodiments disclosed herein may contemplate using NFC-backed SSI in use cases involving government-issued IDs or other identity documents, the concepts of the present disclosure are not so limited. That is, any process or use case that relies upon obtaining data from an NFC chip to perform a transaction (financial or otherwise) can leverage the NFC-backed SSI solutions described herein.

For context, some forms of SSI evidence contradict core principles of control, persistence, portability, and interoperability. Information backing some identity elements is owned and operated by private companies, who may restrict, alter, or delete that data (not to mention go out of business) without warning. These concerns do not typically apply to government-issued IDs, which incorporate an NFC chip on which NFC data is stored.

Most of the methods proposed to authenticate an SSI today rely on a quantity of identity elements to make up for shortcomings in the authentication quality of any single element. However, the critical flaw in this logic is that these identity elements are far more interconnected than people would care to admit. Yes, a person's identity can be recognized and authenticated by a combination of [mobile phone+social media account #1+social media account #2+banking information], but what happens when the user's email is compromised, or their phone is stolen? Suddenly these "unique" elements all fall like a house of cards, and a bad actor completely controls the user's identity.

NFC authentication, on the other hand, has zero known vulnerability. A user who successfully passes both passive and active authentication absolutely has physical access to the original government-issued ID. In further adaptations, NFC authentication can be combined with face comparison technology, and an unbroken chain of trust can be established directly from the user to the issuing government entity.

Also, there are four central principles of SSI: control, access, consent, and minimalization. Using the systems and methods disclosed herein, an identity owner can freely access their identity elements, select the specific identity elements they wish to share, and rest assured that the remainder of their identity remains protected and unshared. These and other advantages of NFC-backed SSI are disclosed herein and with reference to FIGS. 6, 7, 8A and 8B.

Figure 6:
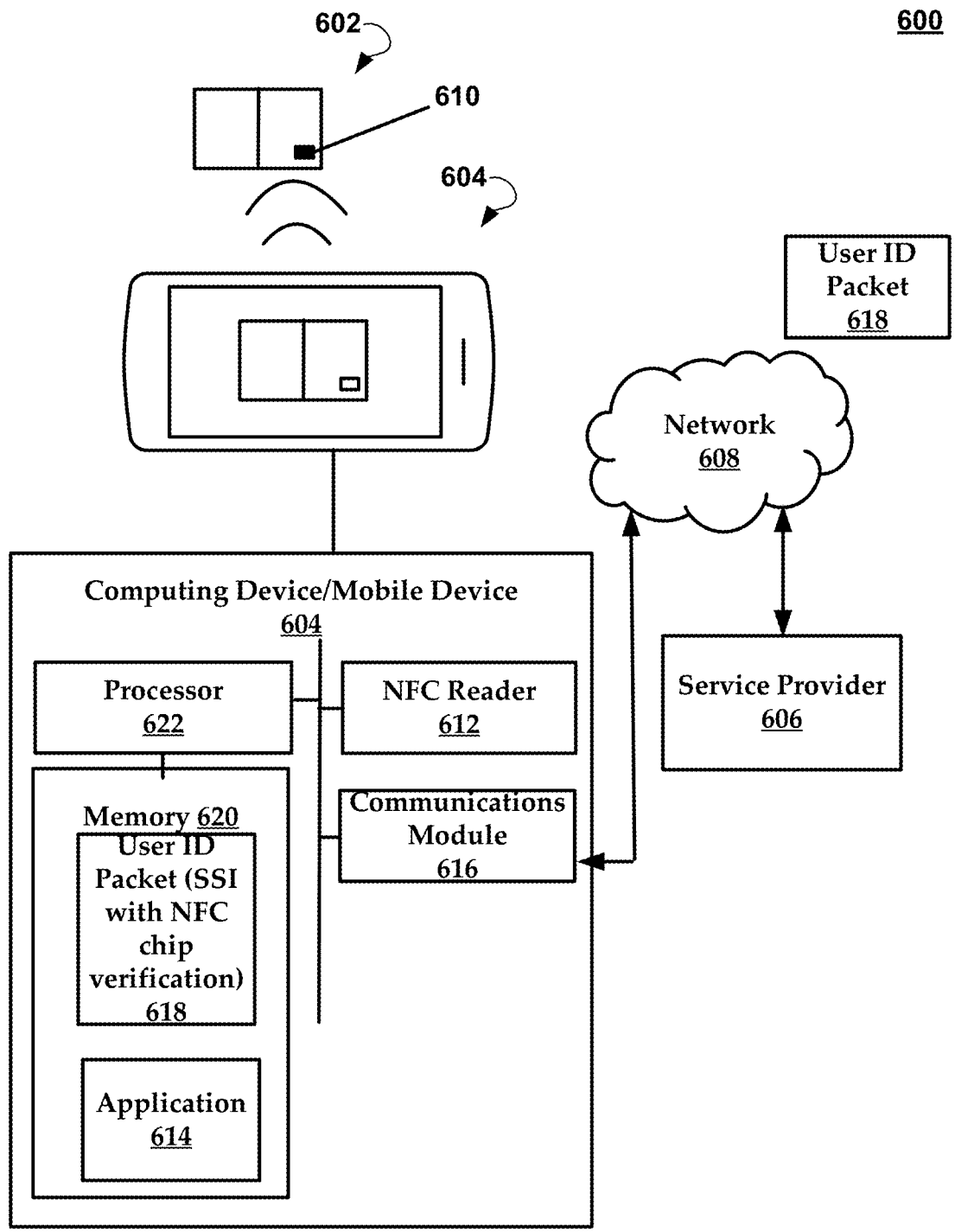
FIG. 6 illustrates an environment within which systems and methods for ID document verification are implemented.

FIG. 6 illustrates another example system 600 that can be used for identification. Generally, the system 600 leverages the tamper-resistant nature of near-field communication hardware to allow for secure identification of a user. Broadly, the user can utilize the system 600 to obtain a user identity packet (e.g., self-sovereign identification data) that can be stored in an encrypted manner on a computing device or a mobile device. Generally, the system 600 leverages the tamper-resistant nature of near-field communication hardware to allow for secure, self-sovereign identification of a user. Broadly, the user can utilize the system 600 to obtain a user identity packet (e.g., self-sovereign identification data) that can be stored in an encrypted manner on a mobile device.

Further details regarding self-sovereign identity systems and methods can be found in related U.S. application Ser. No. 16/917,776 filed on Jun. 30, 2020, entitled "Self-Sovereign Identity Systems and Methods for Identification Documents," which is incorporated by reference.

To be sure, many systems or services require presentation of an ID document for access. These systems or services desire to confirm the identity of the user. Rather than having to submit and verify the user's identification each time such identification is needed by a device/system or service, the user can submit the user identity packet rather than present an ID document such as a driver's license or passport.

In general, the user need only verify their identity and/or ID document once by a service provider using methods disclosed herein. Once the user identity packet is obtained from the service provider and stored on the mobile device, subsequent processes that would have necessitated the use of the ID document can be resolved using the user identity packet stored on the mobile device In general, the system 600 can include an ID document 602, a computing device or a mobile device 604, a service provider 606, and a network 608. The network 608 can include any of the network(s) disclosed infra. The ID document 602 includes a near-field communication (NFC) chip 610 that is adapted to store data such as a country signing certificate, a data hash or other data construct used to store at least information regarding an owner of the ID document. Authentication of data stored on the NFC chip involves performing a chain-of-trust process to analyze the data on the NFC chip that utilizes the country signing certificate. In general, data stored on chip that may be encrypted with a private key. These data can be obtained using a public key provided by the issuing country or other authority.

It will be understood that while some embodiments contemplate the use of NFC or RFID chips, the teachings of the present disclosure are not so limited. That is, the processes disclosed herein can be enabled using similar types of hardware enabled ID documents. Additionally, while some examples rely on the use of the mobile device 604, any other computing device can be configured for use in accordance with the present disclosure. That is, any computing device can be used as long as the computing device includes at least a short-range wireless reader that can be used for NFC, RFID, and the like. In some embodiments, the computing device can be configured to include a camera for obtaining images of a user as disclosed herein.

The mobile device 604 comprises an NFC reader 612 that is configured to read data from the NFC chip 610, an application 614, and a communications module 616. In some embodiments, to determine whether the NFC authentication path or the optical authentication path will be utilized to verify the ID document, the user may be prompted to obtain an image of the ID document 602 from an application 614 executing on the mobile device 604. The application 614 can present a message on the display of the mobile device 604 to prompt the user to obtain an image of the ID document 602 using a camera of the mobile device 604. Once the image of the ID document 602 is obtained, the image can be transmitted to the service provider 606 using the communications module 616 over the network 608.

Figure 7:
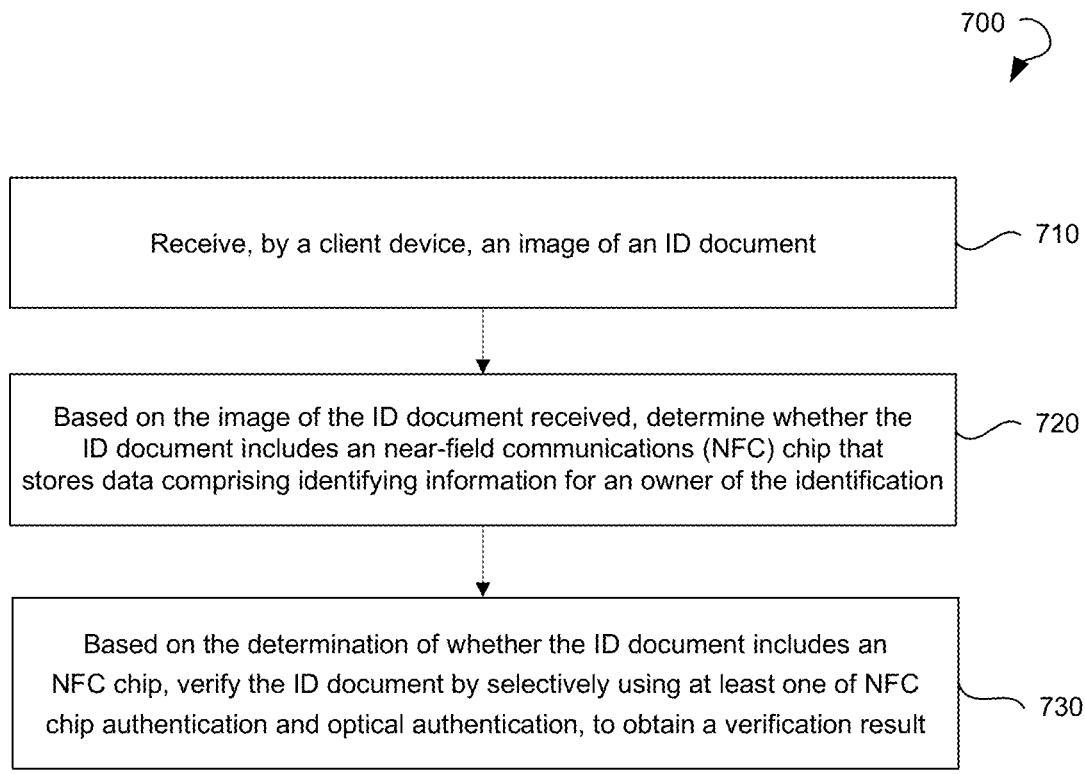
FIG. 7 is a flowchart of an exemplary method of the present disclosure.
Figure 8A:
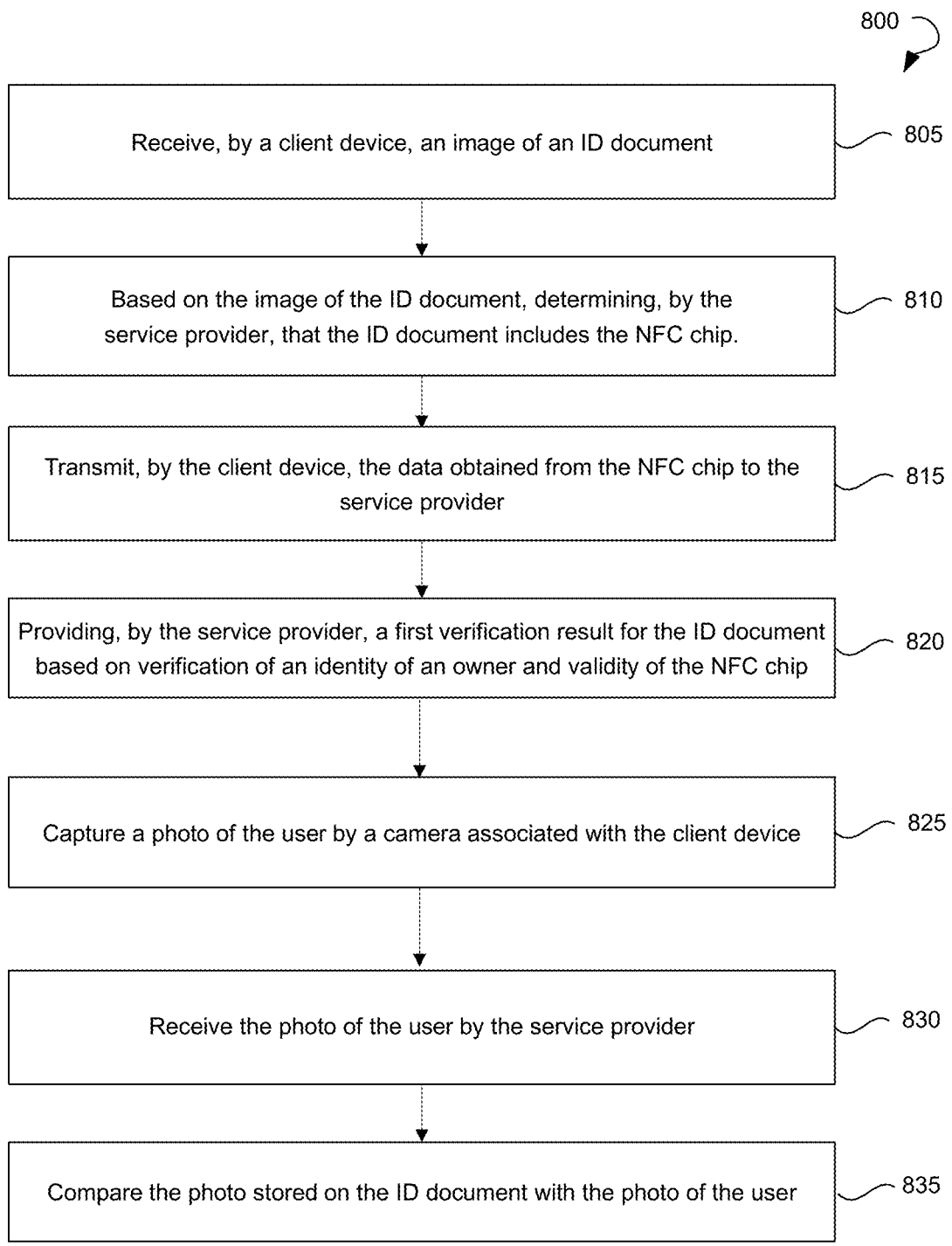
FIGS. 8A and 8B are flowcharts of another example method of the present disclosure.
Figure 8B:
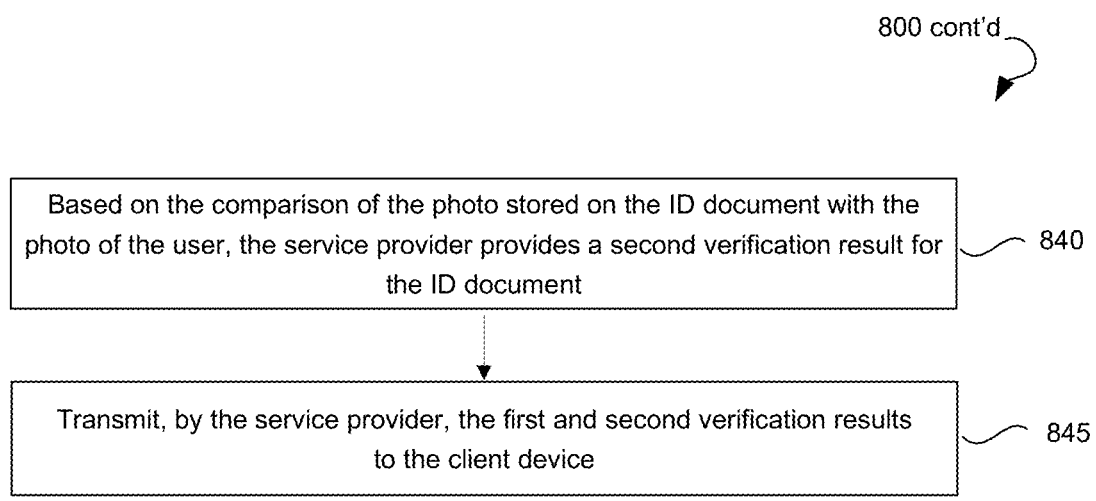

In some embodiments, the ID document 602 can be verified in an optional step using any of the processes described above with respect to the embodiments of FIGS. 1-4 and also in FIGS. 7, 8A and 8B. The application 614 can further prompt the user to extract data stored on the NFC chip 610. Data obtained from the NFC chip 610 can be transmitted to the service provider 606 for verification. For example, using the public key provided by the issuing country, the mobile device 604 can utilize the public key to extract the data on the NFC chip 610 and transmit the same to the service provider 606.

In some instances, the user can be instructed to obtain a current biometric such as a selfie or photograph with their mobile device 604, such as in the case where optical authentication is utilized for ID verification of the ID document. The biometric can be received and evaluated, the biometric being used as a second or additional means for verifying the identity of the owner/user. In some instances, the biometric (other than a photo) can be used to initially verify the identity of the owner/user. The biometric could include a retinal or iris scan, a fingerprint, or other biometric data. The NFC chip 610 or the service provider 606 can store baseline biometric data for the user. These baseline biometric data can be obtained when the user originally applies for or obtains the ID document 602. These data are embedded or stored on the NFC chip 610 of the ID document 602 by the issuing authority. This biometric data can be used to verify that the user is the correct user to be submitting the credentials in question.

The current biometric obtained by the mobile device 604 can be transmitted to the service provider 606. The service provider 606 can evaluate the data extracted from the NFC chip 610 and confirm the identity of the user. As noted above, this can include using a current biometric, in some embodiments.

The service provider 606 can also validate that the data stored on the NFC chip 610 has not been tampered with. This can include examining a hash string of data stored on the NFC chip 610 to ensure data consistency. When the service provider 606 verifies the identity of the owner of the ID document 602 and the validity of the NFC chip 610, the service provider 606 can generate a user identity packet 618. The SSI is augmented with the validation of the NFC chip 610, which can (as noted herein) create an unbroken chain of trust. The user identity packet as described herein can include the SSI that is backed by validation of the NFC chip.

The service provider 606 transmits the user identity packet 618 to the computing or mobile device 604 for storage locally on the mobile device 604. The user identity packet 618 can be stored locally in memory 620 of the mobile device 604. To be sure, the mobile device 604 can include a processor 622 that can execute instructions stored in memory 620 such as the application 614. Advantageously, the user can be alleviated from having to resubmit their ID document 602 each and every time their identity needs to be confirmed. Further details regarding self-sovereign identity systems and methods can be found in related U.S. application Ser. No. 16/917,776 filed on Jun. 30, 2020, entitled "Self-Sovereign Identity Systems and Methods for Identification Documents," which is incorporated by reference.

Additionally, the storage of the user identity packet 618 (NFC chip validation, augmented SSI). on the computing or mobile device 604 effectively and logically links the ID document 602 to the mobile device 604. When a selfie or photograph is used to verify that the user who is operating the mobile device 604 is associated with the ID document 602, the image of the user can be linked to the mobile device 604 and ID document 602. Again, some embodiments do not require the use of a selfie or photograph to enable creation and storage of the user identity packet 618, but in situations where the selfie or photograph is used, this ensures that the mobile device being accessed by the person is also associated with the identity stored on the ID document.

One or more optional databases may be configured to store printed data, photos for facial recognition mechanisms (as described later herein) and digital data, including data comprising identifying information for an owner of the identification document, as well as verification results based on the systems and methods described herein.

In some embodiments, the ID document 602 can be linked with the mobile device 604 by comparing a device identifier with expected or stored information that identifies the mobile device 604. For example, the service provider 606 can determine that an IMEI (International Mobile Equipment Identity) number obtained from the mobile device 604 matches a stored IMEI number for the owner. For example, the stored IMEI can be obtained initially when an owner of the ID document 602 initially registers or provides ownership/identity information to obtain their ID document 602 from an issuing authority. In some embodiments, the IMEI could be read from the mobile device 604 using any known method and compared with prior IMEI information that was obtained at a prior point in time when data was read from the NFC chip 610. To be sure, while an IMEI number has been described, any other data that can be used to uniquely identify a computing device can be used.

FIG. 7 is a process flow diagram showing a method 700 for ID document verification of the present disclosure that can be executed by a mobile device, a computing device or other communication device as disclosed herein. The method 700 may commence with receiving, by a client device, an image of an object, such as an ID document, at operation 710. The ID document may include a government issued ID, a permanent residency ID card, a student ID, an employment ID, a driver's license, a passport, a travel document, and so forth. The received image may include a picture, a scan, and so forth. The image may be captured by a camera associated with the user (for example, a standalone camera; a camera of a user device, such as a smart phone, a PC, a tablet PC; and so forth).

The method 700 may proceed with determining whether the ID document includes a near-field communications (NFC) chip at operation 720. The NFC chip stores data comprising identifying information for an owner of the identification. For instance, the NFC chip may contain a digital passphoto of the owner of the ID document. The image quality of the photo contained on the NFC chip may be significantly higher than that of a normal photo, such as a selfie. Also, if the photo of an ID document is stored on an NFC chip of that ID document, it would be virtually impossible to tamper with such a photo. The determination of whether the ID document includes an NFC chip, based on the image of the ID document, at operation 720, can be performed by the client device (or any other type of computing device), a service provider, in a cloud network or a combination of both the client device, a cloud network, and a service provider. The determination of whether an ID document contains an NFC chip may be based on an image of the ID document. Also, the determination may be based on further factors. In some embodiments, the MRZ (machine readable zone) of the ID document is read and based on this reading, the owner's date of birth and the date of expiry for the ID document are both determined. Then, an issue date of the ID document is computed. This computation may be based on the owner's date of birth, the date of expiry of the ID document and the type of ID document that is at hand. To make this computation, information from a database is obtained. This database stores each country and each ID document type that is issued for a given country. The database provides the validity period of a given ID document. The database also provides the date of when the first ID document with an NFC chip was first issued by that given country. For instance, in some countries, children's passports are valid for 3 years, adult passports are valid for 5 years, and passports for seniors are valid for ten or more years. Finally, a determination is made whether the issue predates or postdates the issue date of the first known ID document having an NFC chip, for that given type of ID document. All of these steps may be done on the client device (on-device), in a cloud network, by a service provider or any combination thereof.

Then, based on the determination of whether the ID document includes an NFC chip that occurs in operation 720, the ID document is verified by selectively using at least one of NFC chip authentication and optical authentication, to obtain a verification result, at operation 730. In some embodiments, upon verifying the ID document, the ID document is logically associated to the client device. In other words, the ID document can be considered logically bound to the client device, such that the mobile device being accessed by the user is also associated with the identity stored on the ID document.

Turning back to operation 730, in some embodiments, NFC chip authentication is utilized when it is determined that the ID document has an NFC chip. Specifically, NFC chip authentication allows for verification of the ID document by verifying the validity of the NFC chip.

In some embodiments, the NFC chip authentication comprises several steps. First, the client device transmits the image of the ID document to the service provider. Then, based on the image of the ID document, the service provider determines that the ID document includes the NFC chip. The service provider then selects or other determines that NFC chip authentication is suitable for verification of the ID document. Then, data obtained from the near-field communications (NFC) chip of the ID document is transmitted to the service provider. The service provider provides a verification result for the ID document based on verification of an identity of the owner and validity of the NFC chip. Then, the verification result is transmitted by the service provider to the client device.

In some embodiments, a user identity packet is received from the service provider. The user identity packet is generated by the service provider based on verification of an identity of the owner and validity of the NFC chip. The user identity package is transmitted by the service provider, the user identity packet to the client device for storage.

Returning to operation 730, if an NFC chip is not detected or not included on the ID document, an optical authentication takes place, rather than the NFC chip authentication. Specifically, optical authentication allows for verification of the ID document by comparing an ID photo of the ID document against a photo of the user of the mobile or computing device. In other embodiments, optical authentication allows for verification of the ID document by comparing a ID photo of the ID document against a previously stored or previously authenticated photo of the owner of the client device.

In some embodiments, the optical authentication comprises several steps. First, the client device transmits the image of the ID document to the service provider. Then, based on the image of the ID document, the service provider determines that the ID document does not include the NFC chip or the NFC chip is not detected by the NFC reader. The service provider then selects or otherwise determines that optical authentication is suitable for user verification (verification that the user is who they claim to be). Then, a photo of the user (a selfie) is captured, by a camera associated with the client device. The photo of the user is received from the client device by the service provider. The service provider then compares the ID photo with the selfie photo taken by the user. Based on the comparison made by the service provider of these two photos, the service provider provides a user verification result. This user verification result is transmitted by the service provider to the client device. In some embodiments, the user verification result comprises a confirmation of authenticity of the user when the photo stored on the ID document shares matching characteristics (e.g., face map) to that of the selfie photo of a user of the client device. The ID document can be verified in an optional step using any of the processes described above with respect to the embodiments of FIGS. 1-4 and also in FIGS. 7, 8A and 8B.

Optical authentication can be done by two-way face comparison or three-way comparison as described earlier herein.

For either or both of the NFC chip authentication and optical authentication methods described herein, the verification result may comprise a determination of at least one evidence of falsification. In response to the determination of at least one evidence of falsification, the service provider may reject the ID document and transmit such a notification of this rejection to the client device.

Now referring to both FIGS. 8A and 8B, FIGS. 8A and 8B are process flow diagrams showing a method 800 for ID document verification utilizing hybrid NFC and optical authentication of the present disclosure that can be executed by a mobile device as disclosed herein. The method 800 comprises a hybrid method which utilizes both NFC authentication and optical authentication to provide maximum authentication. In some embodiments, this hybrid method is desirable for when maximum authentication and security layers are required, such as in the case of when one wishes to open a bank account. The bank may wish to ensure that the true identity of a prospective bank account holder and therefore may wish to have both NFC authentication and optical authentication to verify all the data that is available to the bank.

The method 800 can commence by receiving an image of an ID document by a client device at operation 805. Based on the image of the ID document, the service provider determines that the ID document includes the NFC chip that stores data comprising identifying information for an owner of the identification at operation 810. Also, the determination of whether an ID document contains an NFC chip may be based on further factors. In some embodiments, the MRZ (machine readable zone) of the ID document is read and based on this reading, the owner's date of birth and the date of expiry for the ID document are both determined. Then, an issue date of the ID document is computed. This computation may be based on the owner's date of birth, the date of expiry of the ID document and the type of ID document that is at hand. To make this computation, information from a database is obtained. This database stores each country and each ID document type that is issued for a given country. The database provides the validity period of a given ID document. The database also provides the date of when the first ID document with an NFC chip was first issued by that given country. For instance, in some countries, children's passports are valid for 3 years, adult passports are valid for 5 years, and passports for seniors are valid for ten or more years. Finally, a determination is made whether the issue predates or postdates the issue date of the first known ID document having an NFC chip, for that given type of ID document. All of these steps may be done on the client device (on-device), in a cloud network, by a service provider or any combination thereof.

Then, the data obtained from the near-field communications (NFC) chip of the ID document is transmitted by the client device to the service provider at operation 815. The service provider provides a first verification result for the ID document based on verification of an identity of the owner and validity of the NFC chip at operation 820.

In alternative embodiments, for one or more of the operations 810, 815 and 820, the client device (on-device) performs these steps, rather than the service provider. In yet further alternative embodiments, for one or more of the operations 810, 815, and 820, these steps occur in the cloud network, such as the network 608 in FIG. 6, rather than by the service provider.

The method 800 continues with capturing a photo of the user by a camera associated with the client device at operation 825. At operation 830, the photo of the user is received by the service provider. At operation 835, the service provider compares the photo stored on the ID document with the photo of the user. In an optional step, the service provider may compare the photo stored on the ID Document, the photo of the user and any previously stored photo(s) of the verified owner of the client device, in any combination.

Turning back to the method 800, based on the comparison of the photo stored on the ID document with the photo of the user to verify the identity of the owner, the service provider provides a second verification result for the ID document at operation 840. In some embodiment, if the photo stored on the ID document shared matching characteristics (e.g., face map) with the photo of the user, then the second verification result may be a verification of identity of the owner. At operation 845, the service provider transmits both the first and second verification results to the client device.

In some embodiments, data of the verified ID document may be used to automatically populate an electronic form, fields associated with a web resource, and so forth. Thus, filling in forms, may be facilitated and accelerated. Moreover, automatic filling in of electronic forms or blanks allows avoiding mistakes and misprints pertaining to manual entry.

The service provider can also be configured to execute method steps such as receiving an image of the identification document by the service provider from a mobile device and confirming presence of the identification document based on the image. Example methods can further include receiving a photograph of a user of the mobile device and confirming the user by comparing the photograph of the user to a stored image of the user using facial recognition. When the image matches the stored image, the mobile device can be linked to the identity document based on the user identity packet.

The exemplary embodiments described herein can be implemented in an operating environment comprising computer-executable instructions (e.g., software) installed on a computer, in hardware, or in a combination of software and hardware. The computer-executable instructions can be written in a computer programming language or can be embodied in firmware logic. If written in a programming language conforming to a recognized standard, such instructions can be executed on a variety of hardware platforms and for interfaces to a variety of operating systems.

In some embodiments, the computer system 500 may be implemented as a cloud-based computing environment, such as a virtual machine operating within a computing cloud. In other embodiments, the computer system 500 may itself include a cloud-based computing environment, where the functionalities of the computer system 500 are executed in a distributed fashion. Thus, the computer system 500, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners, or such systems may be accessible to outside users who deploy applications within the computing infrastructure to obtain the benefit of large computational or storage resources.

The cloud may be formed, for example, by a network of web servers that comprise a plurality of computing devices, such as a client device, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a central processing unit (CPU) for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, DVD, any other optical medium, any other physical medium with patterns of marks or holes, a RAM, a Programmable Read-Only Memory (PROM), an Erasable Programmable Read-Only Memory (EPROM), an Electrically Erasable Programmable Read-Only Memory (EEPROM), a FlashEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider).

The corresponding structures, materials, acts, and equivalents of all means or steps plus function elements in the claims below are intended to include any structure, material, or act for performing the function in combination with other claimed elements as specifically claimed. The description of the present technology has been presented for purposes of illustration and description, but is not intended to be exhaustive or limited to the disclosure. Many modifications and variations will be apparent to those of ordinary skill in the art without departing from the scope and spirit of the disclosure. Exemplary embodiments were chosen and described in order to best explain the principles of the present technology and its practical application, and to enable others of ordinary skill in the art to understand the disclosure for various embodiments with various modifications as are suited to the particular use contemplated.

Aspects of the present technology are described above with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Thus, computer-implemented methods and systems for identification document verification are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A computer-implemented method for user identification (ID) verification, the method comprising:
   receiving, by a client device, an image of an ID document;
   based on the image of the ID document received, determining whether the ID document includes a near-field communications (NFC) chip that stores an ID photo associated with the ID document;
   based on the determination of whether the ID document includes the NFC chip, verifying the ID document by selectively using at least one of NFC chip authentication and optical authentication, to obtain a first verification result;
   capturing a photo of a user by a camera associated with the client device;
   receiving the photo of the user by a service provider;
   comparing, by the service provider, the ID photo stored on the ID document with the photo of the user;
   based on the comparison, providing a second verification result for the ID document; and
   transmitting both the first and second verification results to the client device.

2. The method of claim 1, wherein when the ID photo that is stored on the ID document shares matching characteristics with the photo of the user, then the second verification result comprises a verification of identity of an owner of the ID document.

3. The method of claim 2, further comprising automatically populating an electronic form or fields associated with a web resource, with data of the verified ID document.

4. The method of claim 1, further comprising:
   receiving an image of the ID document by the service provider from the client device; and
   confirming presence of the ID document based on the image.

5. The method of claim 1, further comprising receiving a photograph of the user of the client device and confirming the user, by comparing the photograph of the user to a stored image of the user using facial recognition.

6. The method of claim 5, wherein when the photograph of the user matches the stored image of the user, the client device is linked to the ID document based on a user identity packet.

7. The method of claim 1, wherein determining of whether the ID document includes the NFC chip is performed using at least one of the client device, the service provider, a cloud network and any combination thereof.

8. The method of claim 1, wherein the ID document comprises one of a government issued ID, a permanent residency ID card, a student ID, an employment ID, a driver's license, a passport, and a travel document.

9. The method of claim 1, wherein the received image of the ID document is a picture or a scan.

10. The method of claim 1, wherein the ID photo includes a digital passphoto of an owner of the ID document.

11. The method of claim 1, wherein the ID document includes a machine readable zone (MRZ).

12. The method of claim 11, further comprising:
   reading the MRZ of the ID document; and
   based on the reading of the MRZ of the ID document, determining a date of birth of an owner of the ID document and a date of expiry for the ID document.

13. The method of claim 1, wherein upon verifying the ID document by using at least one of the NFC chip authentication and the optical authentication, the ID document is logically associated to the client device.

14. The method of claim 1, wherein, based on a determination that the ID document includes the NFC chip, selecting the NFC chip authentication for verification of the ID document.

15. The method of claim 1, wherein, based on a determination that the ID document does not include the NFC chip, selecting the optical authentication for verification of the ID document.

16. A system for user identification (ID) document verification, the system comprising:
- a client device for capturing an image of an ID document;
- at least one processor associated with the client device; and
- a memory communicatively coupled with the at least one processor, the memory storing instructions, which when executed by the at least one processor performs a method comprising:
  - receiving, by a computing device, an image of an ID document;
  - based on the image of the ID document received, determining whether the ID document includes a near-field communications (NFC) chip that stores an ID photo associated with the ID document;
  - based on the determination of whether the ID document includes the NFC chip, verifying the ID document by selectively using at least one of NFC chip authentication and optical authentication, to obtain a first verification result;
  - capturing a photo of a user by a camera associated with the client device;
  - receiving the photo of the user by a service provider;
  - comparing, by the service provider, the ID photo stored on the ID document with the photo of the user;
  - based on the comparison, providing a second verification result for the ID document; and
  - transmitting both the first and second verification results to the client device.

17. The system of claim 16, wherein when the photo that is stored on the ID document shares matching characteristics with the photo of the user, then the second verification result comprises a verification of identity of an owner of the ID document.

18. The system of claim 17, the method further comprising automatically populating an electronic form or fields associated with a web resource, with data of the verified ID document.

19. The system of claim 16, the method further comprising:
- receiving an image of the ID document by the service provider from the client device; and
- confirming presence of the ID document based on the image.

20. The system of claim 16, the method further comprising receiving a photograph of the user of the client device and confirming the user, by comparing the photograph of the user to a stored image of the user using facial recognition.

21. The system of claim 20, wherein when the photograph of the user matches the stored image of the user, the client device is linked to the ID document based on a user identity packet.

22. The system of claim 16, wherein determining of whether the ID document includes the NFC chip is performed using at least one of the client device, the service provider, a cloud network and any combination thereof.

23. The system of claim 16, wherein the ID document comprises one of a government issued ID, a permanent residency ID card, a student ID, an employment ID, a driver's license, a passport, and a travel document.

24. The system of claim 16, wherein the received image of the ID document is a picture or a scan.

25. The system of claim 16, wherein the ID photo includes a digital passphoto of an owner of the ID document.

26. The system of claim 16, wherein the ID document includes a machine readable zone (MRZ).

27. The system of claim 26, the method further comprising:
- reading the MRZ of the ID document; and
- based on the reading of the MRZ of the ID document, determining a date of birth of an owner of the ID document and a date of expiry for the ID document.

28. The system of claim 16, wherein upon verifying the ID document by using at least one of the NFC chip authentication and the optical authentication, the ID document is logically associated to the client device.

29. The system of claim 16, wherein, based on a determination that the ID document includes the NFC chip, selecting the NFC chip authentication for verification of the ID document.

30. The system of claim 16, wherein, based on a determination that the ID document does not include the NFC chip, selecting the optical authentication for verification of the ID document.

* * * * *